US012578843B2

(12) United States Patent (10) Patent No.: US 12,578,843 B2

Liao et al. (45) Date of Patent: Mar. 17, 2026

(54) APPLICATION ICON CONTROL METHOD AND APPARATUS, AND ELECTRONIC DEVICE

(71) Applicant: VIVO MOBILE COMMUNICATION CO., LTD., Dongguan (CN)

(72) Inventors: Weijian Liao, Dongguan (CN); Qiuju Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 677 days.

(21) Appl. No.: 18/094,339

(22) Filed: Jan. 6, 2023

(65) Prior Publication Data

US 2023/0152949 A1     May 18, 2023

Related U.S. Application Data

(63) Continuation of application No. PCT/CN2021/105411, filed on Jul. 9, 2021.

(30) Foreign Application Priority Data

Jul. 9, 2020    (CN) .......................... 202010656982.5

(51) Int. Cl.
*G06F 3/0484* (2022.01)
*G06F 3/04817* (2022.01)
(Continued)

(52) U.S. Cl.
CPC ........ *G06F 3/0484* (2013.01); *G06F 3/04817* (2013.01); *G06F 3/04842* (2013.01); *G06F 3/0486* (2013.01)

(58) Field of Classification Search
CPC .............. G06F 3/0484; G06F 3/04817; G06F 3/04842; G06F 3/0486; G06F 3/04883; G06F 3/04886; G06F 3/04847
See application file for complete search history.

(56) References Cited

U.S. PATENT DOCUMENTS 6,781,575 B1 * 8/2004 Hawkins ........... H04M 1/27475
345/169
2007/0157089 A1 * 7/2007 Van Os ............... G06F 3/04842
715/702

(Continued)

FOREIGN PATENT DOCUMENTS

CN        102981711 A      3/2013
CN        103472982 A      12/2013
(Continued)

OTHER PUBLICATIONS

International Search Report issued in corresponding International Application No. PCT/CN2021/105411, mailed Oct. 12, 2021, 6 pages.

(Continued)

*Primary Examiner* — Ryan Barrett
(74) *Attorney, Agent, or Firm* — IPX PLLC

(57) ABSTRACT

An application icon control method and apparatus, and an electronic device are provided. The method includes: receiving a first input on a first blank display region in a target page; and controlling, in response to the first input, at least one application icon located in a first icon region to move to the first blank display region. The first icon region is located in a first direction of the first blank display region.

15 Claims, 10 Drawing Sheets

(51) Int. Cl.
G06F 3/04842 (2022.01)
G06F 3/0486 (2013.01)

(56) References Cited

U.S. PATENT DOCUMENTS

| | | | | |
|---|---|---|---|---|
| 2009/0178008 A1* | 7/2009 | Herz | | G06F 9/542 |
| | | | | 715/840 |
| 2009/0313567 A1* | 12/2009 | Kwon | | G06F 3/0482 |
| | | | | 715/830 |
| 2010/0070931 A1* | 3/2010 | Nichols | | G06F 3/0488 |
| | | | | 715/863 |
| 2010/0131880 A1* | 5/2010 | Lee | | H04M 1/7243 |
| | | | | 345/173 |
| 2010/0223563 A1* | 9/2010 | Green | | G06F 3/0481 |
| | | | | 709/221 |
| 2010/0295789 A1* | 11/2010 | Shin | | G06F 1/1626 |
| | | | | 715/765 |
| 2011/0061010 A1* | 3/2011 | Wasko | | G06F 3/065 |
| | | | | 715/835 |
| 2011/0252375 A1* | 10/2011 | Chaudhri | | H04N 7/147 |
| | | | | 715/835 |
| 2012/0030628 A1* | 2/2012 | Lee | | G06F 3/04817 |
| | | | | 715/835 |
| 2012/0066630 A1* | 3/2012 | Kim | | G06F 3/0488 |
| | | | | 715/810 |
| 2012/0084692 A1* | 4/2012 | Bae | | G06F 3/0486 |
| | | | | 715/769 |
| 2012/0254790 A1* | 10/2012 | Colombino | | G06F 16/58 |
| | | | | 715/781 |
| 2012/0304084 A1* | 11/2012 | Kim | | G06F 3/0488 |
| | | | | 715/762 |
| 2012/0311485 A1* | 12/2012 | Caliendo, Jr. | | G06F 3/0486 |
| | | | | 715/804 |
| 2013/0125043 A1* | 5/2013 | Jeon | | G06F 3/04815 |
| | | | | 345/173 |
| 2016/0334946 A1* | 11/2016 | Chiang | | G06F 3/04883 |
| 2017/0336944 A1* | 11/2017 | Liu | | G06F 3/04883 |
| 2019/0310764 A1 | 10/2019 | Li | | |
| 2020/0333944 A1* | 10/2020 | Guo | | G06F 3/0486 |
| 2020/0379631 A1* | 12/2020 | Karlsson | | G06F 3/04842 |
| 2021/0019038 A1* | 1/2021 | Li | | G06F 3/04817 |
| 2022/0171522 A1* | 6/2022 | Yang | | G06F 3/04883 |
| 2023/0221846 A1* | 7/2023 | Zhou | | G06F 3/0488 |
| | | | | 715/763 |
| 2024/0176628 A1* | 5/2024 | Yang | | G06F 3/04886 |
| 2025/0036272 A1* | 1/2025 | Li | | G06F 3/04845 |
| 2025/0224851 A1* | 7/2025 | Fan | | G06F 3/04817 |

FOREIGN PATENT DOCUMENTS

| | | | | |
|---|---|---|---|---|
| CN | 104731458 A | 6/2015 | | |
| CN | 104731472 A | 6/2015 | | |
| CN | 105320395 A | 2/2016 | | |
| CN | 105808061 A | 7/2016 | | |
| CN | 106354373 A | 1/2017 | | |
| CN | 106598382 A | 4/2017 | | |
| CN | 106843642 A | 6/2017 | | |
| CN | 106843842 A | 6/2017 | | |
| CN | 108052249 A | 5/2018 | | |
| CN | 111831182 A | 10/2020 | | |
| EP | 0969387 A2 | 1/2020 | | |
| EP | 4383246 A1 * | 6/2024 | | G06F 3/0482 |
| JP | 2005222697 A | 8/2005 | | |
| JP | 2013073528 A | 4/2013 | | |
| JP | 2020035468 A | 3/2020 | | |

OTHER PUBLICATIONS

First Office Action issued in related Chinese Application No. 202010656982.5 , mailed Jun. 1, 2021, 6 pages.
Notice of Reasons for refusal issued in related Japanese Application No. 2022-575282, mailed Aug. 6, 2024, 9 pages.

* cited by examiner

900

910

920

1000

Electronic device

1002

Memory

1001

Processor

APPLICATION ICON CONTROL METHOD AND APPARATUS, AND ELECTRONIC DEVICE

CROSS-REFERENCE TO RELATED APPLICATIONS

This application is a continuation of International Application No. PCT/CN2021/105411, filed on Jul. 9, 2021, which claims priority to Chinese Patent Application No. 202010656982.5, filed on Jul. 9, 2020. The entire contents of each of the above-referenced applications are expressly incorporated herein by reference.

TECHNICAL FIELD

This application relates to the field of communications technologies, and specifically, to an application icon control method and apparatus, and an electronic device.

BACKGROUND

In an existing desktop application icon editing system, two types of desktop application icon sorting methods are supported: one is automatically filling application icons in a blank position of the desktop, and the other is manually sorting the application icons to fill the blank display region of the desktop. During editing the desktop, automatically filling the blank display region will cause batch changes of desktop icon positions which is not conducive to finding desktop icons and maintaining use habits of users, and the user needs to sort the icons manually; while a one-by-one adjustment is required in manually moving the application icons to fill the blank display region of the desktop, which is less efficient and less fun, and leads to poor user experience.

SUMMARY

An objective of embodiments of this application is to provide an application icon control method and apparatus, and an electronic device.

This application is implemented as follows.

According to a first aspect, an embodiment of this application provides an application icon control method, including:

receiving a first input on a first blank display region in a target page; and controlling, in response to the first input, at least one application icon located in a first icon region to move to the first blank display region, where the first icon region is located in a first direction of the first blank display region.

According to a second aspect, an embodiment of this application provides an application icon control apparatus, including:

a receiving module, configured to receive a first input on a first blank display region in a target page; and a response module, configured to control, in response to the first input, at least one application icon located in a first icon region to move to the first blank display region, where the first icon region is located in a first direction of the first blank display region.

According to a third aspect, an embodiment of this application provides an electronic device, comprising a processor, a memory, and a program or instruction stored on the memory and runnable on the processor, where when the program or instruction is executed by the processor, the steps of the method according to the first aspect are implemented.

According to a fourth aspect, an embodiment of this application provides a readable storage medium, storing a program or instruction, where when the program or instruction is executed by a processor, the steps of the method according to the first aspect are implemented.

According to a fifth aspect, an embodiment of this application provides a chip, including a processor and a communication interface, where the communication interface is coupled to the processor, and the processor is configured to run a program or instruction to implement the method according to the first aspect.

In the embodiments of this application, during editing the application icons in a display page of the electronic device, through performing the first input on the blank display region to cause application icons around the blank display region to move to the blank display region according to a certain rule, a position change range of the application icons may be limited, a use custom of a user may be met, and the icon sorting efficiency may be improved.

DETAILED DESCRIPTION

The following describes the technical solutions in embodiments of this application with reference to the accompanying drawings in the embodiments of this application. Apparently, the described embodiments are some of the embodiments of this application rather than all of the embodiments. All other embodiments derived by a person of ordinary skill in the art based on the embodiments of this application without creative efforts shall fall within the protection scope of this application.

In the specification and claims of this application, the terms "first", "second", and the like are used to distinguish similar objects, but are not used to describe a specific sequence or order. It may be understood that the data used in such a way is interchangeable in proper circumstances, so that the embodiments of this application can be implemented in other sequences than the sequence illustrated or described herein. The objects distinguished through "first", "second", and the like are generally of a same type and the number of the objects are not limited, for example, a first object may be one or more than one. In addition, "and/or" in this specification and the claims represents at least one of the connected objects, and a character "/" used herein generally indicates an "or" relationship between associated objects.

An application icon control method according to the embodiments of this application is described in detail below with reference to the accompanying drawings through embodiments and application scenarios thereof.

Figure 1:
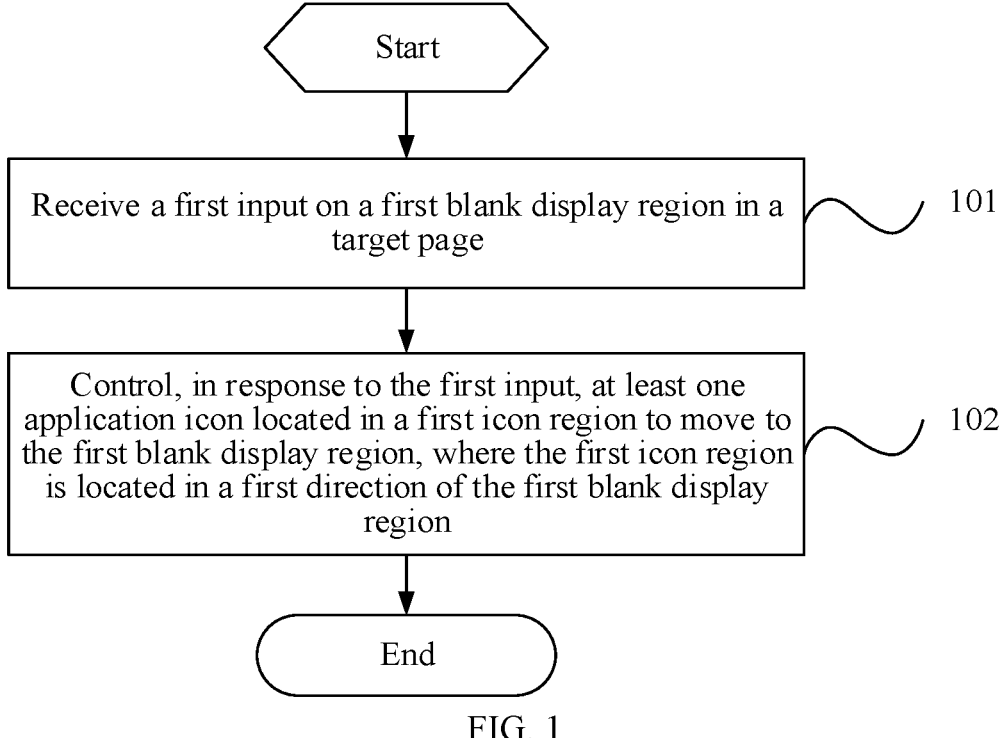
FIG. 1 is a schematic flowchart of an application icon control method according to an embodiment of this application.

As shown in FIG. 1, an embodiment of this application provides an application icon control method, including:

Step 101: Receive a first input on a first blank display region in a target page.

Figure 2:
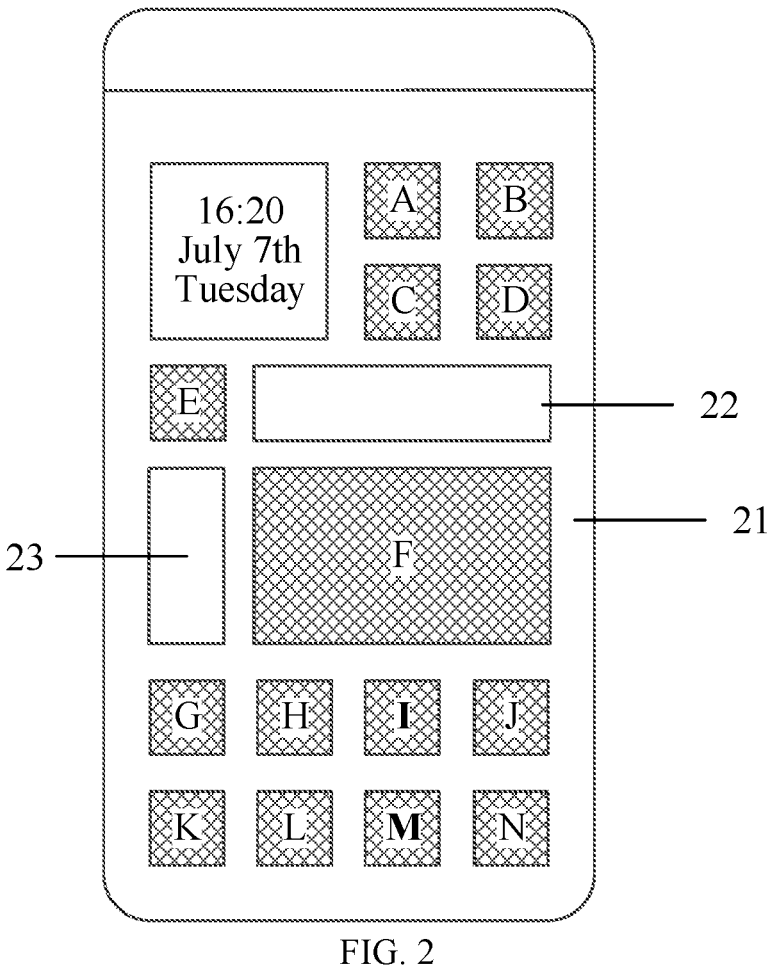
FIG. 2 is a schematic diagram of a blank display region according to an embodiment of this application.

The target page is any interface displayed with an application icon on an electronic device. In the target page, at least one application icon is displayed, a region other than the at least one application icon is a blank display region, and a region displayed with the at least one application icon is an icon region. As shown in FIG. 2, totally fourteen application icons (A-N) are displayed in the target page 21. A first region 22 and a second region 23 other than the application icons are both the blank display regions, where the first blank display region may be the first region 22 or the second region 23.

The first input is an input by a user on the first blank display region, which may be a click operation or a slide operation, or may be set as another gesture operation as required. During receiving the first input, the electronic device considers that the user has the requirement of filling the first blank display region with an application icon, that is, moving an application icon in another region to the first blank display region.

Step 102: Control, in response to the first input, at least one application icon located in a first icon region to move to the first blank display region, where the first icon region is located in a first direction of the first blank display region.

In this embodiment, the first icon region may be any icon region on the target page, where a plurality of icon regions may exist in the target page, and different icon regions are formed by application icons separated by the blank display region. As shown in FIG. 2, an upper part of the first region 22 is an icon region, and a lower part of the first region 22 is another icon region. That the first blank display region is the first region 22 is taken as an example. The first icon region may be a region above the first region 22, or may be a region below the first region 22, that is, upper application icons may be moved down into the first blank display region, or lower application icons may be moved up into the first blank display region.

After receiving the first input, the electronic device moves application icons located in the first icon region into the first blank display region. A movement rule of the application icons may be fixed, for example: after receiving the first input, application icons below the first blank display region are controlled to move into the first blank display region in sequence; or, the movement rule of the application icons is determined according to the first input, for example: the first input is a gesture operation from bottom to top by a user, and then the first direction is below the first blank display region and the first icon region is an icon region located below the first blank display region, and then the application icons below the first blank display region are controlled to move into the first blank display region in sequence.

In the embodiments of this application, during editing the application icons in a display page of the electronic device, through performing the first input on the blank display region to cause application icons around the blank display region to move to the blank display region according to a certain rule, a position change range of the application icons may be defined, a use custom of a user may be met, and the icon sorting efficiency may be improved.

For example, the foregoing step 102 may include: calculating a quantity of movable application icons according to remaining display space of the first blank display region: and controlling, according to the quantity of movable application icons, the at least one application icon in the first icon region to move to the first blank display region according to a first rule.

The remaining display space is space of the first blank display region which can accommodate a standard-sized application icon currently, and a quantity of application icons that can be accommodated may be calculated according to the remaining display space. For example: when the first blank display region is the first region 22 shown in FIG. 2, the quantity of application icons that can be accommodated is three; and when the first blank display region is the second region 23 shown in FIG. 2, the quantity of application icons that can be accommodated is two. For a non-standard-sized application icon, for example, an icon F in FIG. 2, a quantity of standard-sized application icons to which the non-standard-sized application icon corresponds needs to be calculated, so as to determine whether to move the non-standard-sized application icon. According to the quantity of the application icons that can be accommodated in the first blank display region, the at least one application icon in the first icon region is moved into the first blank display region.

That the first direction is below the first blank display region is taken as an example, and the first rule may be: starting to move from left to right in the same row in the first blank display region, and moving according to the order of icons from top to bottom when crossing rows, that is, if there are icons on a right side of the first blank display region, the icons are moved to the left in sequence started from a first icon on the right side, and when a first row of the first blank display region is filled, a second row of the first blank display region starts to be filled until an original position of the first blank display region is all filled, and the first blank display region is moved to a bottom right corner of the target page or reaches another blank display region of the target page. In this embodiment, the first direction is preset, that is, when the first input is received, the application icons below the first blank display region are directly moved to the first blank display region.

Figure 3:
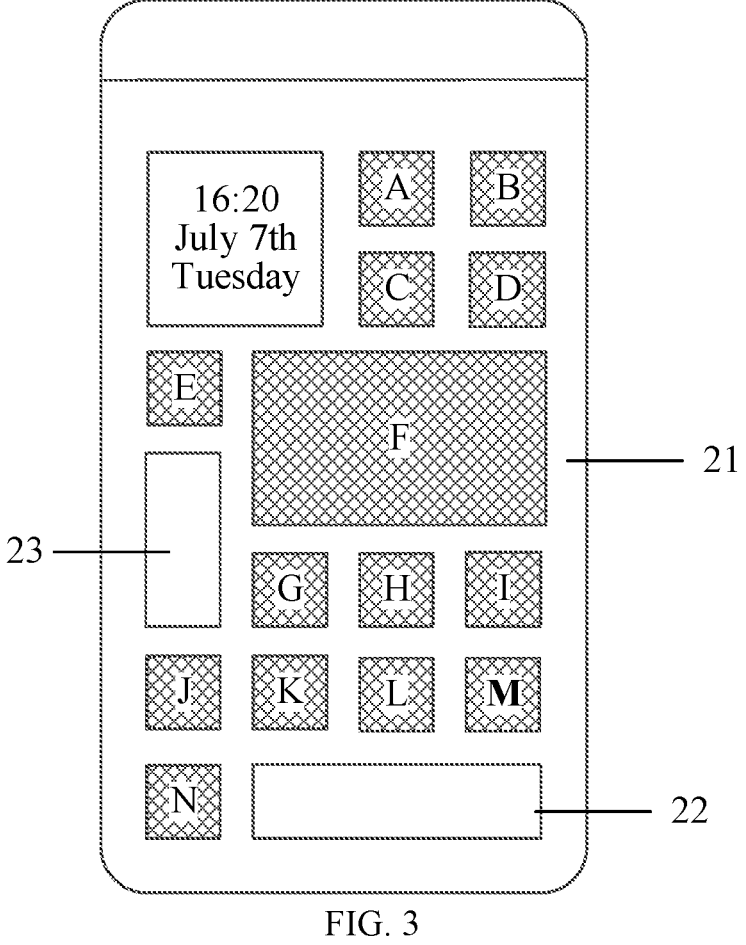
FIG. 3 is a first schematic diagram of an application icon movement according to an embodiment of this application.

The first rule may be set according to a demand and the use custom of the user. For example, the first blank display region is the first region 22 in FIG. 2, and the first icon region is the icon region (that is the region where the icons F-N are located in FIG. 2) below the first region 22. The quantity of standard-sized application icons that can be accommodated by the first region 22 is three, and a horizontal side length of the icon F is equivalent to a size of three standard-sized application icons, then as shown in FIG. 3, the icon F is moved up to the first region 22, and icons G-N below the icon F are moved in sequence until an original position of the first region 22 is filled finally, and the first region 22 is moved to a bottom right corner of the target page 21.

For example, the step 102 may include: recognizing an operation direction corresponding to the first input; determining the first direction according to the operation direction; and controlling the at least one application icon in the first icon region located in the first direction to move to the first blank display region according to a second rule.

Figure 4:
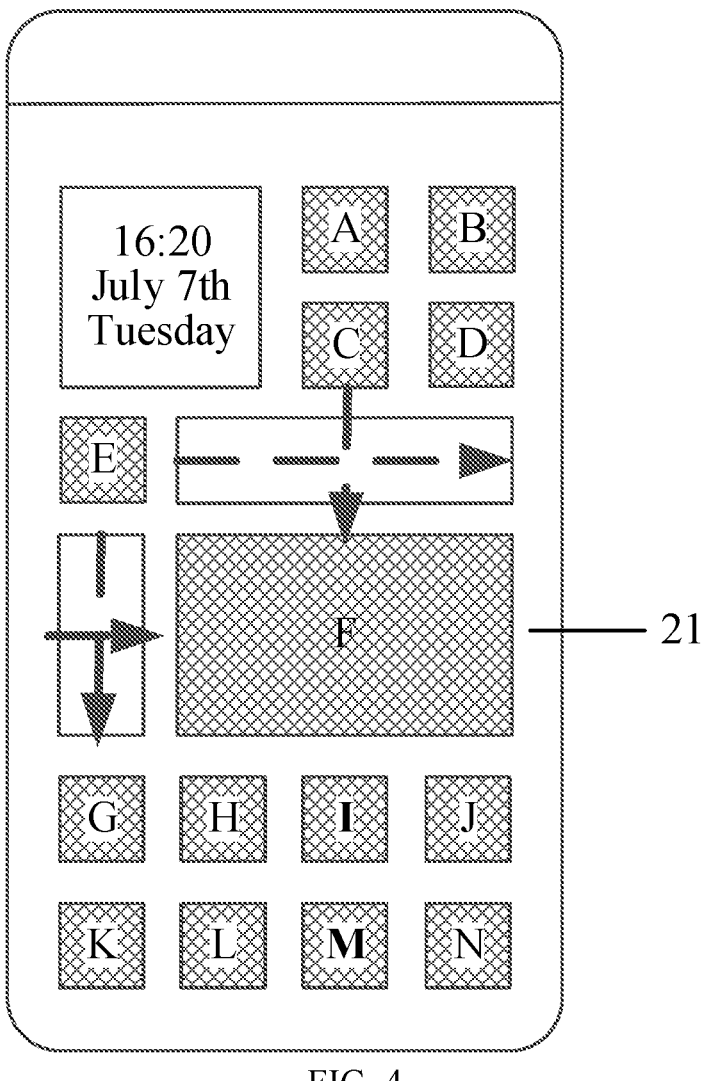
FIG. 4 is a schematic diagram of a gesture operation according to an embodiment of this application.

In this embodiment, the first input may be a gesture operation of the user, and the first direction may be determined by an operation direction when the user performs the first input. For example, the first input is a slide operation of the user on the first blank display region, then the slide gesture in the blank display region of the user may be as shown in FIG. 4. When the user slides from left to right, the first direction is left, and then the first icon region is an icon region on a left side of the first blank display region; when the user slides from bottom to top, the first direction is down, and then the first icon region is an icon region below the first blank display region; and when the user slides from top to bottom, the first direction is up, and then the first icon region is an icon region above the first blank display region. After the first icon region is determined, icons in the first icon region is moved to the first blank display region according to the second rule. The first direction in this embodiment is not preset and needs to be determined according to the first input.

Figure 5:
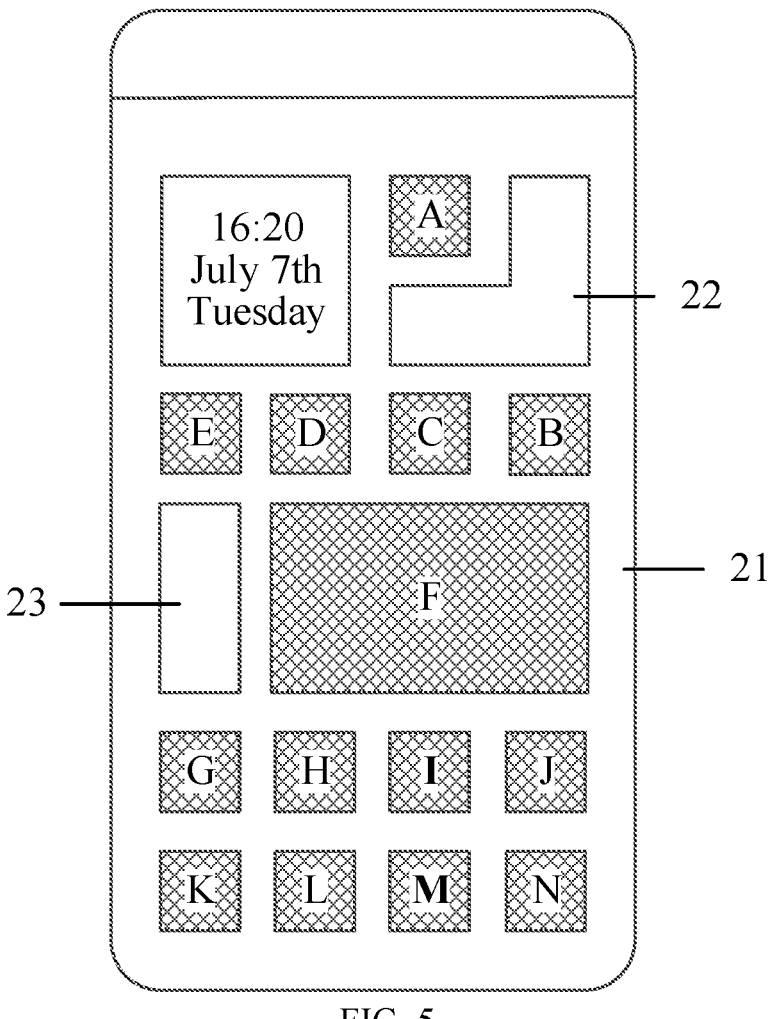
FIG. 5 is a second schematic diagram of an application icon movement according to an embodiment of this application.

It is to be noted that, the second rule may be set according to a demand and the use custom of the user. The second rule may be the same as or different from the first rule. For example, the first blank display region is the first region 22 in FIG. 2, and the first icon region is the icon region (that is the region where the icons A-D are located in FIG. 2) above the first region 22. The quantity of standard-sized application icons that can be accommodated by the first region 22 is three, then as shown in FIG. 5, an icon D, an icon C, and an icon B are moved into the first blank display region in sequence, and the original position of the first region 22 is filled finally, and the first blank display region is moved to a top right corner of the target page 21 and cannot be moved again.

When the first input is a gesture operation of the user on the first blank display region, for example, when the user slides throughout the first blank display region, the first blank display region disappears, and a movement for position coverage from an end of the first blank display region to another end of the first blank display region may be performed according to a horizontal direction or vertical direction of the slide gesture. If there are no application icons movable at an end of the first blank display region, the movement for position coverage will not occur. In a case that there are no icons at the end of the first blank display region, the slide gesture is changed to sliding to left, right, up, or down, and then a movement rule for position coverage of the first blank display region is changed to a movement rule for position coverage in the case that there are no icons at the end of the first blank display region, that is, the movement for position coverage is performed from right/left, and bottom/top to left/right, and top/bottom.

In some embodiments, the controlling at least one application icon located in a first icon region to move to the first blank display region further includes:

controlling, in a case that a first side length of a first target icon to be moved is greater than a second side length of the first blank display region, a second target icon adjacent to the first target icon to be moved to the first blank display region, where the first side length is a side length of a first side of the first target icon to be moved, the second side length is a side length of a second side of the first blank display region, and the first side and the second side are sides in a same direction. For example: the first side is an upper side of the first target icon, and the second side is an upper side of the first blank display region; or the first side is a left side of the first target icon, and the second side is a left side of the first blank display region.

Figure 6:
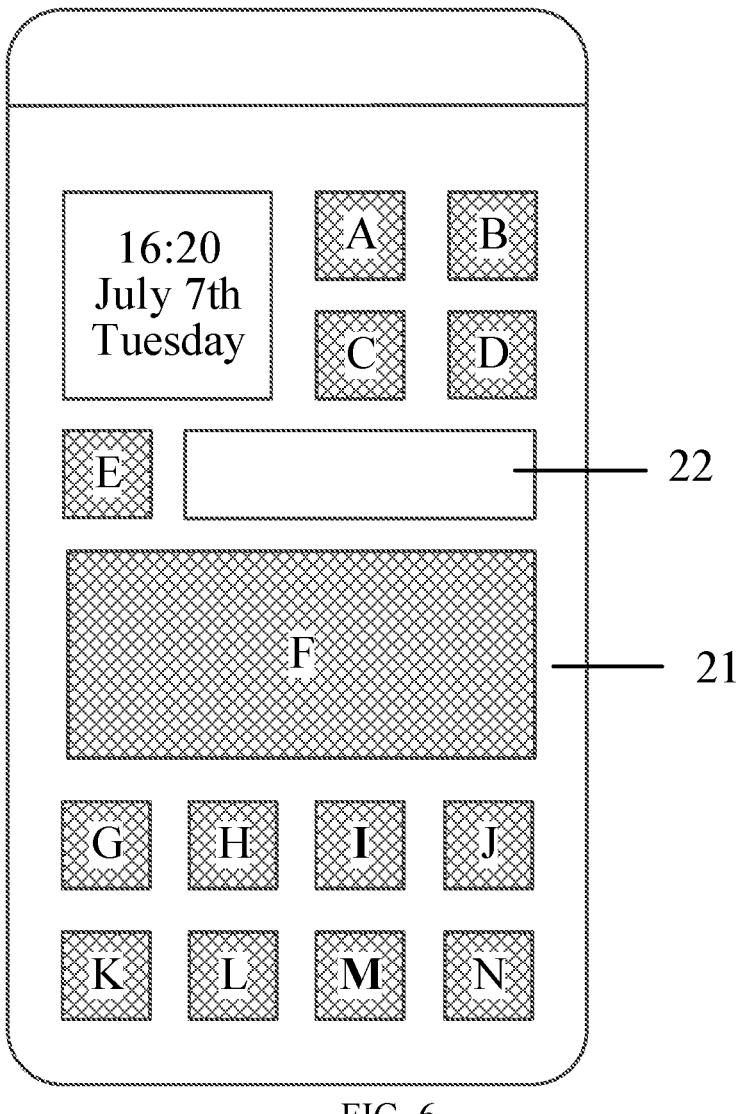
FIG. 6 is a schematic diagram of a non-standard-sized application icon according to an embodiment of this application.

In this embodiment, to ensure the neatness of the application icons, in a case that a size of a first target icon to be moved cannot meet a requirement of moving to the first blank display region, the first target icon is skipped, and a second target icon that meets the size requirement and is adjacent to the first target icon is moved into the first blank display region. For example: as shown in FIG. 6, the first blank display region is the first region 22, and the first target icon is an icon F, then the first blank display region may accommodate three standard-sized application icons in total. As shown in FIG. 6, a horizontal side length of the icon F is a length of four standard-sized application icons, while a horizontal side length of the first region 22 is a length of three standard-sized application icons, then the icon F cannot be moved and is skipped during moving, and icons G-I are moved into the first region 22.

For example: if the first blank display region is larger than a 1*1 standard-sized application icon position, a quantity of 1*1 standard icons supporting to be moved is calculated according to occupation space of the application icons in the first blank display region. During a position coverage process, if an application icon larger than a 1*1 standard size is met, when a side length of a position coverage size matches a side length of a non-standard application icon size and the two sides are adjacent to each other, the non-standard application icon may be moved on a horizontal plane with the same side length for position coverage, otherwise the non-standard application icon cannot be moved, and other standard application icons will bypass the non-standard application icon for position coverage according to the position coverage rule.

During moving the icons, the at least one application icon is stopped moving in a case that a current state of the first blank display region meets a target condition, where the target condition includes at least one of the following:

a) displaying the at least one application icon in all of the first blank display region. That is, the original position of the first blank display region is filled with the application icons. Due to the movement of the application icons, actually the first blank display region has been moved to another position. As shown in FIG. 2 and FIG. 3, the original position of the first blank display region is the position of the first region 22 shown in FIG. 2, and after the icons are moved, the original first region 22 has been filled, and the first region 22 has become a position shown in FIG. 3, that is, a position located at the bottom of the target page 21.

b) displaying the at least one application icon in a partial region of the first blank display region, where a remaining region other than the partial region in the first blank display region is connected to a second blank display region. For example: assuming that a first blank display region can accommodate nine standard-sized application icons, while there are only four application icons below the first blank display region 21, and there exists a second blank display region below the four application icons, then after the four application icons are moved to the first blank display region 21, there remains a position of five application icons, the position of five application icons is adjacent to and then connected to the second blank display region to form a big blank display region, and the application icons are stopped moving in this case.

c) displaying the at least one application icon in a partial region of the first blank display region, where a remaining region other than the partial region in the first blank display region is located in a preset position of the target page. In this embodiment, for example: assuming that a first blank display region 21 can accommodate nine standard-sized application icons, while there are only four application icons below the first blank display region 21, and what below the four application icons is the bottom of the target page, then after the four application icons are moved to the first blank display region 21, there remains a position of five application icons, the position of five application icons has been at the bottom of the target page, and the application icons are stopped moving in this case. It is to be noted that, the preset position may be the bottom, the top, the left side, or the right side of the target page, which may be set as required. For example: when the application icons are moved from bottom to top, the application icons may be stopped moving when a remaining region other than the partial region in the first blank display region is located at the top of the target page.

Figure 7:
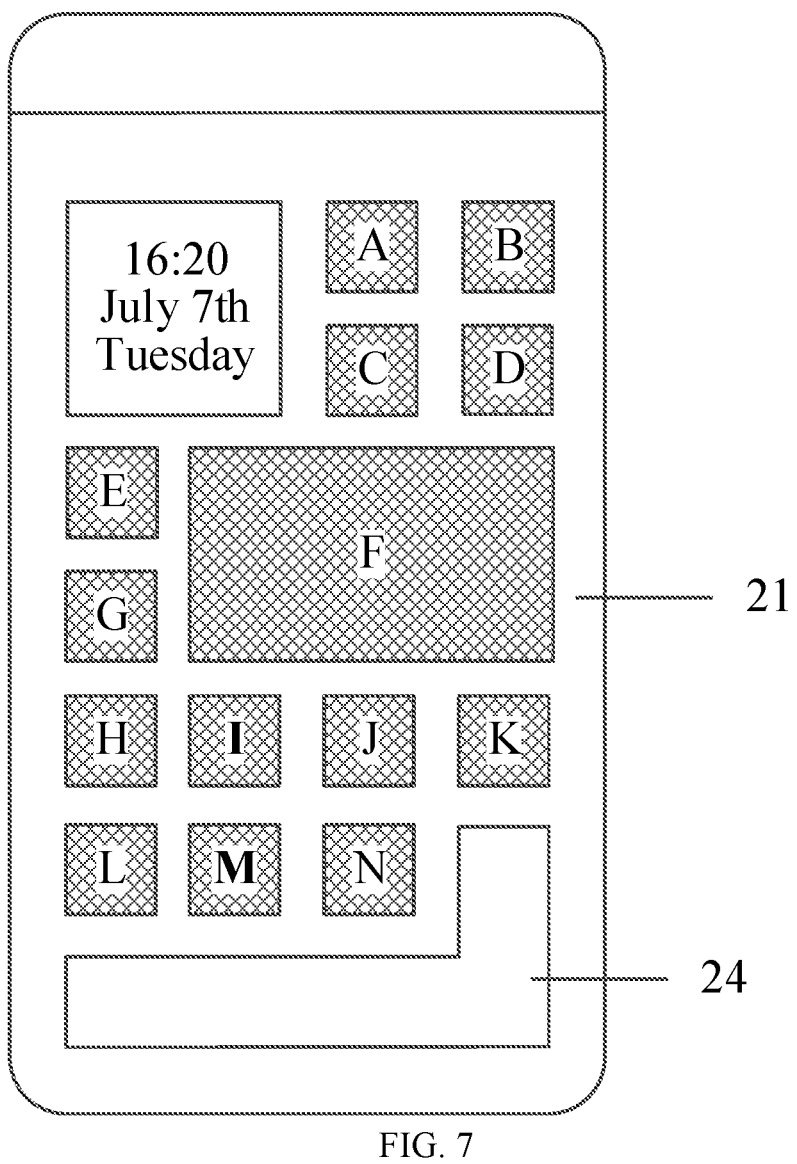
FIG. 7 is a third schematic diagram of an application icon movement according to an embodiment of this application.

In some embodiments, when the target page 21 includes at least two blank display regions, for example, as shown in FIG. 2 to FIG. 5, the target page 21 includes a first region 22 and a second region 23, and an icon movement may be performed on both the two blank display regions. For example, the first blank display region is the first region 22, and the second blank display region is the second region 23. An initial position of application icons in the target page 21 is shown in FIG. 2, the icon movement is performed on the first region 22 first, and icons located below the first region 22 may be moved into the first region 22 in sequence, that is, to form the FIG. 3; and then the icon movement is performed on the second region 23, and application icons located on the right side and below the second region 23 are moved into the second region 23. Because the second region 23 can merely accommodate 2 application icons, then an icon G and an icon H are moved into the second region 23, and icons after the icon H are moved forward in sequence for position coverage. As shown in FIG. 7, a third region 24 equal to a sum of areas of the first region 22 and the second region 23 is formed at the bottom of the target page 21 after the position coverage is performed, and the application icons are stopped moving in this case.

In some embodiments, before receiving a first input on a first blank display region in a target page, the method further includes: controlling to display the target page in an editable state, where the first blank display region is displayed as a floating window in the editable state; and before moving the at least one application icon located in a first icon region to the first blank display region, the method further includes: canceling to display the floating window.

In this embodiment, after entering a desktop editing state, an electronic device recognizes a blank display region of a target page in a desktop, and displays the blank display region in an editable state. Under the editable state, the first blank display region is displayed as the floating window similar to a floating state of an application icon. The floating window of the first blank display region in this application is blank inside and merely displays a floating frame. During moving the application icons, the floating window disappears.

In some embodiments, the receiving a first input on a first blank display region in a target page includes: receiving a first input on a first control in the first blank display region.

Figure 8:
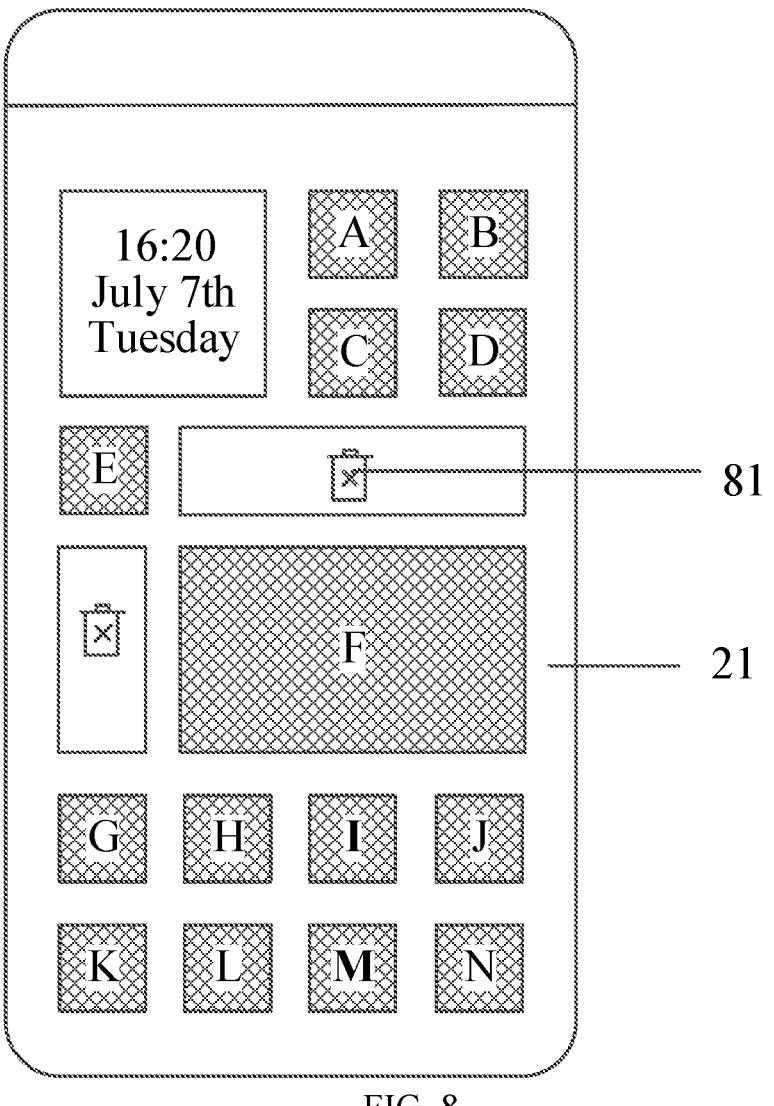
FIG. 8 is a schematic diagram of a first control according to an embodiment of this application.

In this embodiment, after entering the desktop editing state, the electronic device recognizes the blank display region of the target page in the desktop, the first control may be in the blank display region, and as shown in FIG. 8, the first control 81 may be a "clear" icon. The first input on the first blank display region by the user may be a click operation on the first control. For example: the user clicks the "clear" icon in the first blank display region, the first blank display region shrinks to disappear, presenting an effect of bubble bursting. After the first blank display region disappears, position coverage filling is performed on the application icons in the first icon region in the first direction.

To sum up, in the embodiments of this application, during editing the application icons in a display page of the electronic device, through performing the first input on the blank display region to cause application icons around the blank display region to move to the blank display region according to a certain rule, a position change range of the application icons may be defined, a use custom of a user may be met, and the icon sorting efficiency may be improved. Through the gesture operation of the blank display region of the desktop, a variety of filling methods for the blank display region of the desktop can be implemented, and a variety of desktop layouts can be explored in an irregular desktop icon layout, which can enhance the fun and improve the user experience.

It is to be noted that, the application icon control method according to the embodiments of this application may be performed by an application icon control apparatus, or, a control module configured to perform the application icon control method in the application icon control apparatus. In an embodiment of this application, that the application icon control apparatus performs the application icon control method is taken as an example for description of the application icon control apparatus according to this embodiment of this application.

Figures 9, 10:
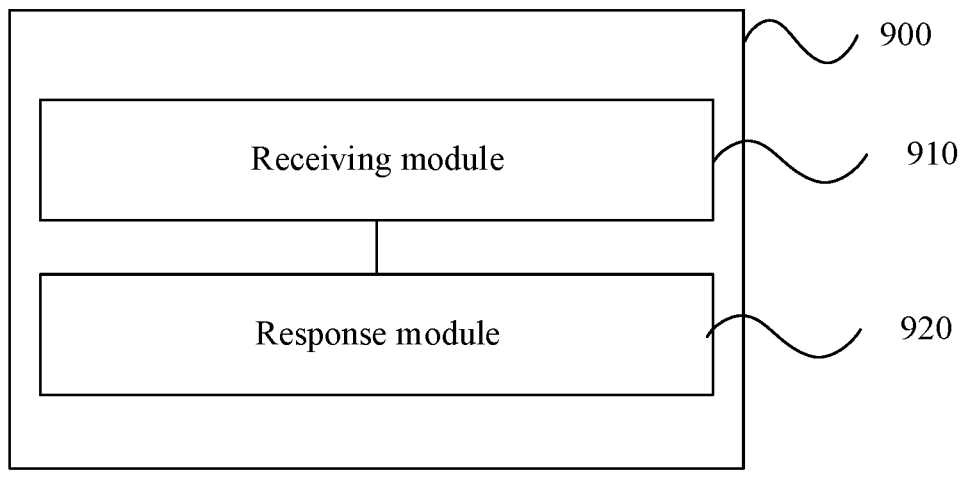
FIG. 9 is a schematic diagram of a module of an application icon control apparatus according to an embodiment of this application.
FIG. 10 is a schematic structural diagram of an electronic device according to an embodiment of this application.

As shown in FIG. 9, an embodiment of this application provides an application icon control apparatus 900, including:

a receiving module 910, configured to receive a first input on a first blank display region in a target page; and a response module 920, configured to control, in response to the first input, at least one application icon located in a first icon region to move to the first blank display region, where the first icon region is located in a first direction of the first blank display region.

In some embodiments, the response module 920 includes:

a calculation unit, configured to calculate a quantity of movable application icons according to remaining display space of the first blank display region; and a first processing unit, configured to control, according to the quantity of movable application icons, the at least one application icon in the first icon region to move to the first blank display region according to a first rule.

In some embodiments, the response module 920 includes:

a recognition unit, configured to recognize an operation direction corresponding to the first input;

a determining unit, configured to determine the first direction according to the operation direction; and a second processing unit, configured to control the at least one application icon in the first icon region located in the first direction to move to the first blank display region according to a second rule.

In some embodiments, the response module further includes:

a third processing unit, configured to control, in a case that a first side length of a first target icon to be moved is greater than a second side length of the first blank display region, a second target icon adjacent to the first target icon to be moved to move to the first blank display region, where the first side length is a side length of a first side of the first target icon to be moved, the second side length is a side length of a second side of the first blank display region, and the first side and the second side are sides in a same direction.

In some embodiments, the application icon control apparatus further includes:

a first processing module, configured to stop moving the at least one application icon in a case that the first blank display region meets a target condition, where the target condition includes at least one of the following:

displaying the at least one application icon in all of the first blank display region;

displaying the at least one application icon in a partial region of the first blank display region, where a remaining region other than the partial region in the first blank display region is connected to a second blank display region; or displaying the at least one application icon in a partial region of the first blank display region, where a remaining region other than the partial region in the first blank display region is located in a preset position of the target page.

In some embodiments, the application icon control apparatus further includes:

a display module, configured to control to display the target page in an editable state, where the first blank display region is displayed as a floating window in the editable state; and a second processing module, configured to cancel to display the floating window.

In some embodiments, the receiving module 910 is configured to:

receiving a first input on a first control in the first blank display region.

In the embodiments of this application, during editing the application icons in a display page of the electronic device, through performing the first input on the blank display region to cause application icons around the blank display region to move to the blank display region according to a certain rule, a position change range of the application icons may be limited, a use custom of a user may be met, and the icon sorting efficiency may be improved. Through the gesture operation of the blank display region of the desktop, a variety of filling methods for the blank display region of the desktop can be implemented, and a variety of desktop layouts can be explored in an irregular desktop icon layout, which can enhance the fun and improve the user experience.

The application icon control apparatus in this embodiment of this application may be an apparatus, or may be a component, an integrated circuit, or a chip in a terminal. The apparatus may be a mobile electronic device or may be a non-mobile electronic device. For example, the mobile electronic device may be a mobile phone, a tablet computer, a notebook computer, a palm computer, an in-vehicle electronic device, a wearable device, an Ultra-Mobile Personal Computer (UMPC), a netbook, or a Personal Digital Assistant (PDA): and the non-mobile electronic device may be a server, a Network Attached Storage (NAS), a Personal Computer (PC), a Television (TV), a teller machine, or an automated machine, which are not specifically limited in this embodiment of this application.

The application icon control apparatus in this embodiment of this application may be an apparatus with an operating system. The operating system may be an Android operating system, an iOS operating system, or another possible operating system, which is not specifically limited in this embodiment of this application.

The application icon control apparatus according to this embodiment of this application can implement all processes implemented by the application icon control apparatus in the method embodiments shown in FIG. 1 to FIG. 8, and details are not described herein again to avoid repetition.

In some embodiments, as shown in FIG. 10, the embodiments of this application further provide an electronic device 1000, including a processor 1001, a memory 1002, and a program or instruction stored in the memory 1002 and runnable on the processor 1001, where the program or instruction, when executed by the processor 1001, implements each process of the foregoing application icon control method, and the same technical effects can be achieved. To avoid repetition, details are not described herein again.

It is to be noted that, the electronic device in this embodiment of this application includes the mobile electronic device and the non-mobile electronic device.

Figure 11:
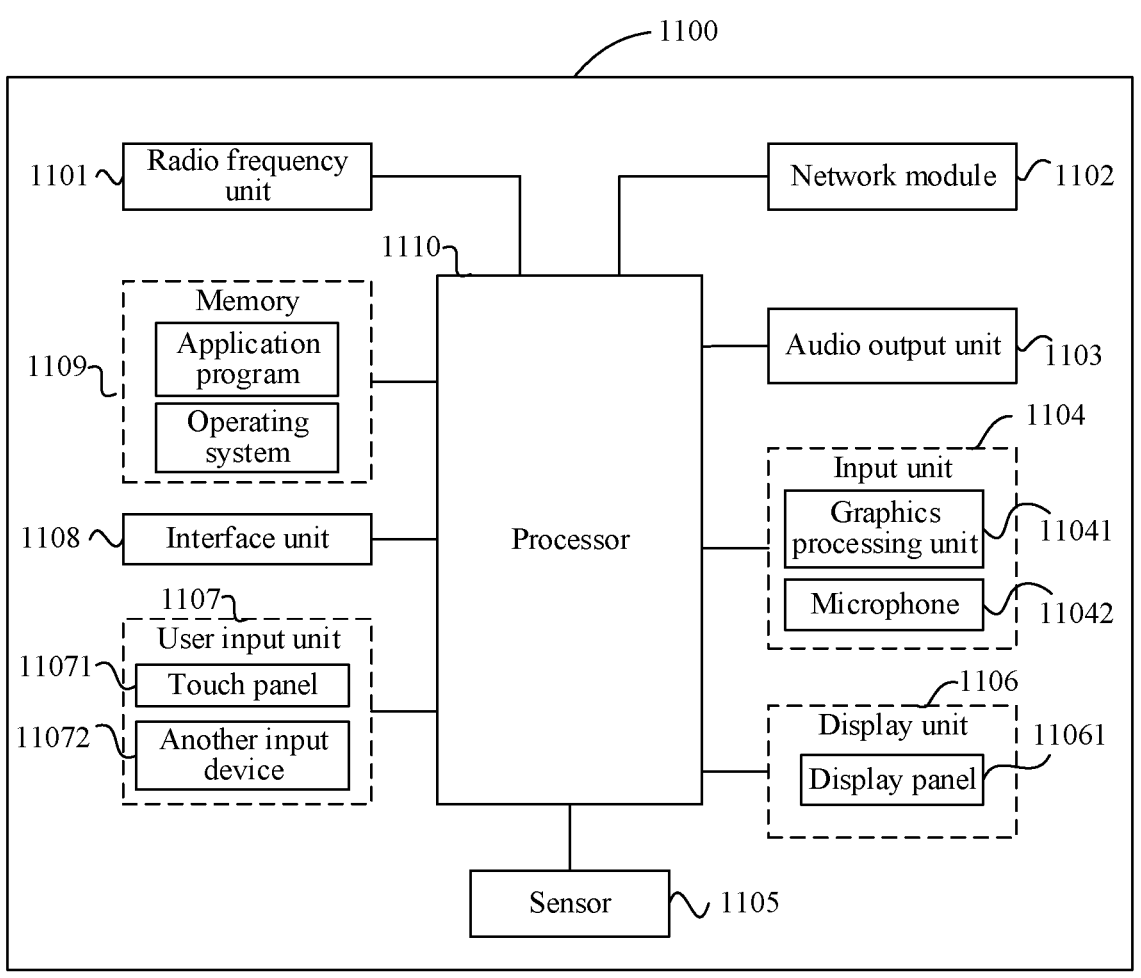
FIG. 11 is a schematic structural diagram of an electronic device according to another embodiment of this application.

FIG. 11 is a schematic diagram of a hardware structure of an electronic device according to an embodiment of this application.

The electronic device 1100 includes, but is not limited to, components such as a radio frequency unit 1101, a network module 1102, an audio output unit 1103, an input unit 1104, a sensor 1105, a display unit 1106, a user input unit 1107, an interface unit 1108, a memory 1109, and a processor 1110.

A person skilled in the art may understand that the electronic device 1100 may further include a power supply (such as a battery) for supplying power to the components. The power supply may be logically connected to the processor 1110 by using a power management system, thereby implementing functions such as charging, discharging, and power consumption management by using the power management system. The structure of the electronic device shown in FIG. 11 constitutes no limitation on the electronic device, and the electronic device may include more or fewer components than those shown in the figure, or some components may be combined, or a different component deployment may be used, which are not described herein again.

The user input unit 1107 is configured to receive a first input on a first blank display region in a target page.

The processor 1110 is configured to control, in response to the first input, at least one application icon located in a first icon region to move to the first blank display region, where the first icon region is located in a first direction of the first blank display region.

In the embodiments of this application, during editing the application icons in a display page of the electronic device, through performing the first input on the blank display region to cause application icons around the blank display region to move to the blank display region according to a certain rule, a position change range of the application icons may be limited, a use custom of a user may be met, and the icon sorting efficiency may be improved.

In some embodiments, the processor 1110 is further configured to calculate a quantity of movable application icons according to remaining display space of the first blank display region; and control, according to the quantity of movable application icons, the at least one application icon in the first icon region to move to the first blank display region according to a first rule.

In some embodiments, the processor 1110 is further configured to recognize an operation direction corresponding to the first input;

determine the first direction according to the operation direction; and control the at least one application icon in the first icon region located in the first direction to move to the first blank display region according to a second rule.

In some embodiments, the processor 1110 is further configured to control, in a case that a first side length of a first target icon to be moved is greater than a second side length of the first blank display region, a second target icon adjacent to the first target icon to be moved to move to the first blank display region, where the first side length is a side length of a first side of the first target icon to be moved, the second side length is a side length of a second side of the first blank display region, and the first side and the second side are sides in a same direction.

In some embodiments, the processor 1110 is further configured to stop moving the at least one application icon in a case that the first blank display region meets a target condition, where the target condition includes at least one of the following:

displaying the at least one application icon in all of the first blank display region;

displaying the at least one application icon in a partial region of the first blank display region, where a remaining region other than the partial region in the first blank display region is connected to a second blank display region; or displaying the at least one application icon in a partial region of the first blank display region, where a remaining region other than the partial region in the first blank display region is located in a preset position of the target page.

In some embodiments, the display unit 1106 is configured to display the target page in an editable state, where the first blank display region is displayed as a floating window in the editable state; and before the controlling at least one application icon located in a first icon region to move to the first blank display region, the display unit 1106 is further configured to cancel to display the floating window.

In some embodiments, the user input unit 1107 is configured to receive a first input on a first blank display region in a target page.

In the embodiments of this application, during editing the application icons in a display page of the electronic device, through performing the first input on the blank display region to cause application icons around the blank display region to move to the blank display region according to a certain rule, a position change range of the application icons may be limited, a use custom of a user may be met, and the icon sorting efficiency may be improved. Through the gesture operation of the blank display region of the desktop, a variety of filling methods for the blank display region of the desktop can be implemented, and a variety of desktop layouts can be explored in an irregular desktop icon layout, which can enhance the fun and improve the user experience.

It is to be understood that, in this embodiment of this application, the input unit 1104 may include a Graphics Processing Unit (GPU) 11041 and a microphone 11042, and the graphics processing unit 11041 processes static pictures or video image data obtained by an image capturing device (such as a camera) in a video capturing mode or an image capturing mode. The display unit 1106 may include a display panel 11061, and the display panel 11061 may be configured by using a liquid crystal display, an organic light-emitting diode, or the like. The user input unit 1107 includes a touch panel 11071 and another input device 11072. The touch panel 11071 is also referred to as a touch screen. The touch panel 11071 may include two parts: a touch detection apparatus and a touch controller. The another input device 11072 may include, but is not limited to, a physical keyboard, a functional key (such as a volume control key or a switch key), a track ball, a mouse, and a joystick, which are not described herein again. The memory 1109 may be configured to store a software program and various data, including, but not limited to an application program and an operating system. The processor 1110 may integrate an application processor and a modem processor, where the application processor mainly processes an operating system, a user interface, an application program, and the like, and the modem processor mainly processes wireless communication. It may be understood that the foregoing modem processor may either not be integrated into the processor 1110.

The embodiments of this application further provide a readable storage medium, storing a program or instruction, where the program or the instruction, when executed by a processor, implements each process of the foregoing application icon control method embodiments, and the same technical effect can be achieved, which is not described in detail herein again to avoid repetition.

The foregoing processor is the processor in the electronic device described in the foregoing embodiment. The readable storage medium includes a computer-readable storage medium, such as, a Read-Only Memory (ROM), a Random Access Memory (RAM), a magnetic disk, or an optical disk.

The embodiments of this application further provide a chip, including a processor and a communication interface, where the communication interface is coupled to the processor, and the processor is configured to run a program or instructions to implement each process of the foregoing application icon control method embodiments and can achieve the same technical effects, which is not described in detail herein again to avoid repetition.

It is to be understood that the chip mentioned in this embodiment of this application may also be referred to as a system-level chip, a system chip, a chip system, a system chip on a chip, or the like.

It may be understood that the embodiments described in the embodiments of the present disclosure may be implemented by hardware, software, firmware, middleware, microcode, or a combination thereof. For hardware implementation, modules, units, submodules, and subunits may be implemented in one or more Application Specific Integrated Circuits (ASICs), Digital Signal Processors (DSPs), DSP Devices (DSPDs), Programmable Logic Devices (PLDs), Field-Programmable Gate Arrays (FPGAs), general-purpose processors, controllers, microcontrollers, microprocessors, other electronic components configured to implement the functions described in this application, or a combination thereof.

It is to be noted that, the term "comprise", "include" or any other variation thereof in this specification is intended to cover a non-exclusive inclusion, which specifies the presence of stated processes, methods, objects, or apparatuses, but does not preclude the presence or addition of one or more other processes, methods, objects, or apparatuses.

Without more limitations, elements defined by a sentence "including one" does not exclude that there are still other same elements in the process, method, object, or apparatus. In addition, it is to be noted that, the scope of the method and apparatus in the embodiments of this application is not limited to performing the functions in the order shown or discussed, but may also include performing the functions in a substantially simultaneous manner or in a reverse order according to the functions involved, for example, the described method may be performed in a sequence different from the described order, and various steps may also be added, omitted, or combined. In addition, features described with reference to certain examples may be combined in other examples.

Through the descriptions of the foregoing implementations, a person skilled in the art may clearly understand that the method according to the foregoing embodiments may be implemented by means of software and a necessary general hardware platform, and may also be implemented by hardware. In some embodiments, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the foregoing embodiments, which are merely illustrative rather than limited. Under the inspiration of this application, a person of ordinary skill in the art can make many forms without departing from the scope of this application and the protection of the claims, all of which fall within the protection of this application.

What is claimed is:

1. An application icon control method, comprising:
controlling to display a target page in an editable state, wherein a first blank display region is displayed as a floating window in the editable state;
receiving a first input on the first blank display region in the target page;
canceling displaying the floating window; and
controlling, in response to the first input, at least one application icon located in a first icon region to move to the first blank display region, wherein the first icon region is located in a first direction of the first blank display region.

2. The application icon control method according to claim 1, wherein the controlling, in response to the first input, at least one application icon located in a first icon region to move to the first blank display region comprises:
calculating a quantity of movable application icons according to remaining display space of the first blank display region; and
controlling, according to the quantity of movable application icons, the at least one application icon in the first icon region to move to the first blank display region according to a first rule.

3. The application icon control method according to claim 2, wherein the controlling at least one application icon located in a first icon region to move to the first blank display region further comprises:
controlling, when a first side length of a first target icon to be moved is greater than a second side length of the first blank display region, a second target icon adjacent to the first target icon to be moved, to move to the first blank display region,
wherein:
the first side length is a side length of a first side of the first target icon to be moved,
the second side length is a side length of a second side of the first blank display region, and
the first side and the second side are sides in a same direction.

4. The application icon control method according to claim 1, wherein the controlling, in response to the first input, at least one application icon located in a first icon region to move to the first blank display region comprises:
recognizing an operation direction corresponding to the first input;
determining the first direction according to the operation direction; and
controlling the at least one application icon in the first icon region located in the first direction to move to the first blank display region according to a second rule.

5. The application icon control method according to claim 1, further comprising:
stopping moving the at least one application icon when the first blank display region meets a target condition, wherein
the target condition comprises at least one of the following:
displaying the at least one application icon in all of the first blank display region;
displaying the at least one application icon in a partial region of the first blank display region, wherein a remaining region other than the partial region in the first blank display region is connected to a second blank display region; or
displaying the at least one application icon in a partial region of the first blank display region, wherein a remaining region other than the partial region in the first blank display region is located in a preset position of the target page.

6. An electronic device, comprising a memory having a computer program stored thereon; and a processor, wherein the computer program, when executed by the processor, causes the processor to perform an application icon control method, comprising:
controlling to display a target page in an editable state, wherein a first blank display region is displayed as a floating window in the editable state;
receiving a first input on the first blank display region in the target page;
canceling displaying the floating window; and
controlling, in response to the first input, at least one application icon located in a first icon region to move to the first blank display region, wherein the first icon region is located in a first direction of the first blank display region.

7. The electronic device according to claim 6, wherein the controlling, in response to the first input, at least one application icon located in a first icon region to move to the first blank display region comprises:
calculating a quantity of movable application icons according to remaining display space of the first blank display region; and
controlling, according to the quantity of movable application icons, the at least one application icon in the first icon region to move to the first blank display region according to a first rule.

8. The electronic device according to claim 7, wherein the controlling at least one application icon located in a first icon region to move to the first blank display region further comprises:

controlling, when a first side length of a first target icon to be moved is greater than a second side length of the first blank display region, a second target icon adjacent to the first target icon to be moved to move to the first blank display region, wherein:

the first side length is a side length of a first side of the first target icon to be moved, the second side length is a side length of a second side of the first blank display region, and the first side and the second side are sides in a same direction.

9. The electronic device according to claim 6, wherein the controlling, in response to the first input, at least one application icon located in a first icon region to move to the first blank display region comprises:

recognizing an operation direction corresponding to the first input;

determining the first direction according to the operation direction; and controlling the at least one application icon in the first icon region located in the first direction to move to the first blank display region according to a second rule.

10. The electronic device according to claim 6, wherein the method further comprises:

stopping moving the at least one application icon when the first blank display region meets a target condition, wherein the target condition comprises at least one of the following:

displaying the at least one application icon in all of the first blank display region;

displaying the at least one application icon in a partial region of the first blank display region, wherein a remaining region other than the partial region in the first blank display region is connected to a second blank display region; or displaying the at least one application icon in a partial region of the first blank display region, wherein a remaining region other than the partial region in the first blank display region is located in a preset position of the target page.

11. A non-transitory computer-readable storage medium storing a program or instruction that, when executed by a processor, causes the processor to perform an application icon control, comprising:

controlling to display a target page in an editable state, wherein a first blank display region is displayed as a floating window in the editable state;

receiving a first input on the first blank display region in the target page;

canceling displaying the floating window; and controlling, in response to the first input, at least one application icon located in a first icon region to move to the first blank display region, wherein the first icon region is located in a first direction of the first blank display region.

12. The non-transitory computer-readable storage medium according to claim 11, wherein the controlling, in response to the first input, at least one application icon located in a first icon region to move to the first blank display region comprises:

calculating a quantity of movable application icons according to remaining display space of the first blank display region; and controlling, according to the quantity of movable application icons, the at least one application icon in the first icon region to move to the first blank display region according to a first rule.

13. The non-transitory computer-readable storage medium according to claim 12, wherein the controlling at least one application icon located in a first icon region to move to the first blank display region further comprises:

controlling, when a first side length of a first target icon to be moved is greater than a second side length of the first blank display region, a second target icon adjacent to the first target icon to be moved to move to the first blank display region, wherein:

the first side length is a side length of a first side of the first target icon to be moved, the second side length is a side length of a second side of the first blank display region, and the first side and the second side are sides in a same direction.

14. The non-transitory computer-readable storage medium according to claim 11, wherein the controlling, in response to the first input, at least one application icon located in a first icon region to move to the first blank display region comprises:

recognizing an operation direction corresponding to the first input;

determining the first direction according to the operation direction; and controlling the at least one application icon in the first icon region located in the first direction to move to the first blank display region according to a second rule.

15. The non-transitory computer-readable storage medium according to claim 11, wherein the method further comprises:

stopping moving the at least one application icon when the first blank display region meets a target condition, wherein the target condition comprises at least one of the following:

displaying the at least one application icon in all of the first blank display region;

displaying the at least one application icon in a partial region of the first blank display region, wherein a remaining region other than the partial region in the first blank display region is connected to a second blank display region; or displaying the at least one application icon in a partial region of the first blank display region, wherein a remaining region other than the partial region in the first blank display region is located in a preset position of the target page.

* * * * *